May 29, 1956          G. LIPPMAN          2,747,646
PROCESS OF AND APPARATUS FOR PRODUCING APPLIQUE ORNAMENTATIONS
Filed Oct. 26, 1955
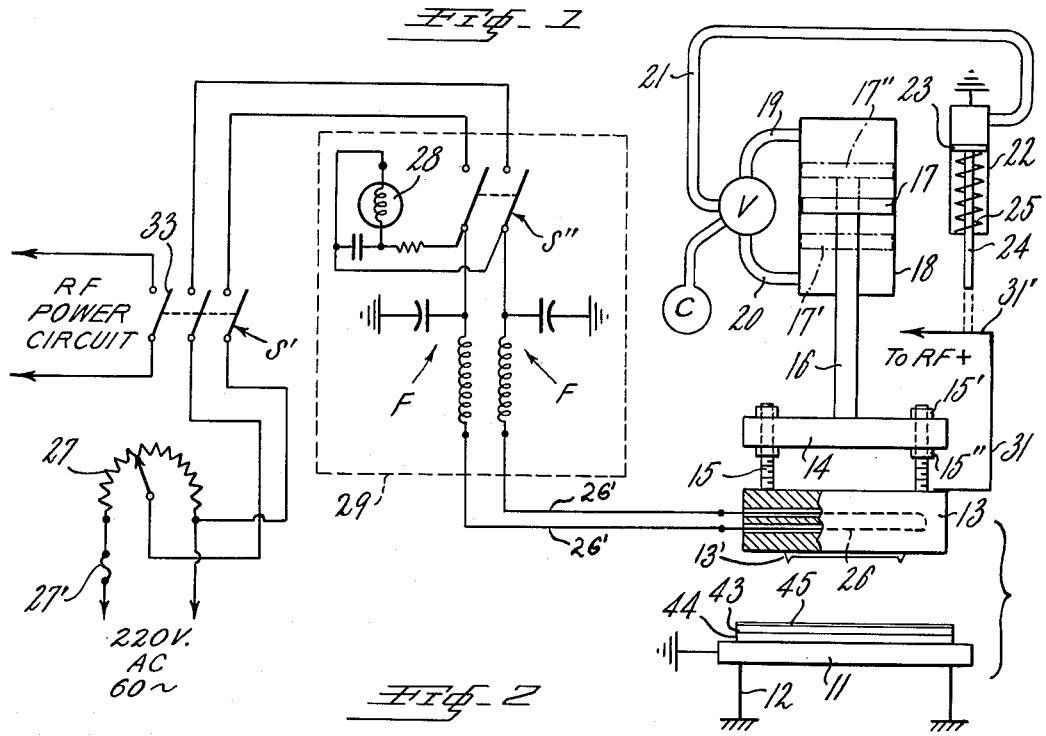
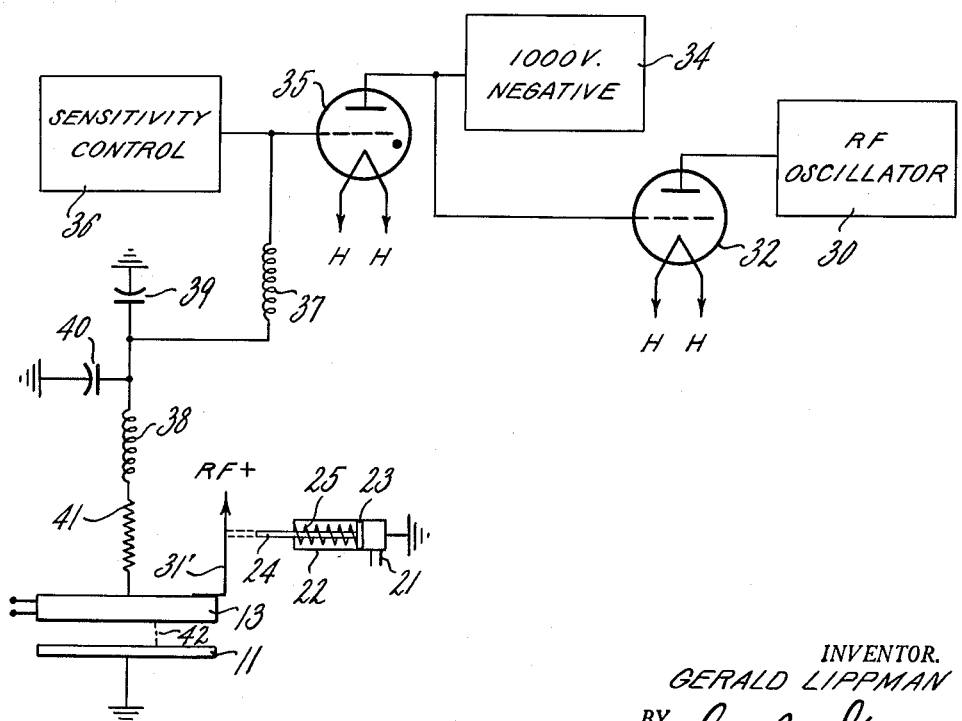
INVENTOR.
GERALD LIPPMAN
BY

United States Patent Office 2,747,646
Patented May 29, 1956

2,747,646

PROCESS OF AND APPARATUS FOR PRODUCING APPLIQUE ORNAMENTATIONS

Gerald Lippman, Kew Gardens, N. Y.

Application October 26, 1955, Serial No. 542,831

14 Claims. (Cl. 154—1)

This invention relates to processes of and apparatus for bonding a number of sheets or layers of plastic to one another, and more particularly deals with applique work for wallets, belts and like ornamented articles.

It is an important object of the present invention to provide means facilitating bonding of a plurality of sheets of plastic material to one another along predetermined contour lines disposed substantially within the peripheral limits of each sheet, whereby unbonded portions of some of said sheets located around said contour lines and within said peripheral limits may be readily removed subsequent to the bonding operation.

It is another object of the present invention to provide means facilitating extremely economic manufacture of ornamented articles of the type having an ornament formed of at least two sheets of plastic material bonded to the surface of another sheet constituting a portion of said article.

Another object of the present invention is the provision of means ensuring formation of well-defined and highly effective bonds between two or more sheets of plastic materials, regardless of whether these sheets are of different thicknesses or not.

Still another object of the present invention is the provision of means effecting heating of said sheets to be bonded or fused to each other through application of both radiant and radio frequency heat in such a manner that heat dissipation from the uppermost one of said sheets during bonding operation is substantially eliminated, the presence of the radiant heat thus permitting a considerable reduction in the amount of radio frequency heat required.

A further object of the present invention is to provide means affording novel and highly efficient apparatus for bonding or joining a plurality of plastic sheets to one another along predetermined lines through the use of both radiant and radio frequency heating means in such a manner that said line bonds between said sheets are completely secure, while for any given power input to the radio frequency heating means a considerably better bond over a large area can be attained than has heretofore been possible.

It is still a further object of the present invention to provide means contributing to apparatus of the aforesaid type in which a die, defining said lines and arranged to contact plastic sheets disposed on a suitable bed plate during bonding operations, is radiantly heated from its interior while a radio frequency field is established between said die and said bed plate for additionally heating said sheets, whereby said heating of said die reduces heat dissipation both to the atmosphere and to the die from the uppermost sheet, while arcing between said die and said plate and consequent damaging of said die are substantially eliminated, thus prolonging the life of said die.

Yet a further object of the present invention is to provide means conducive to greatly simplified and highly efficient apparatus of the aforesaid type which is extremely safe in operation both for the operator and for the material being worked on, whereby the possibility of accidents and materials wastage is substantially eliminated, thus reducing the cost of production of applique work carried out by means of said apparatus.

More particularly, in the field of applique work it has been customary to employ one sheet of thermoplastic material as a base layer and another sheet of a similar (or the same) material as a design layer bonded onto said base layer by means of a heated, suitably shaped die. Where only two sheets are employed, the formation of an adequate bond therebetween has generally not been difficult.

However, when it has been desired to employ more than two sheets of such material, for example three, so as to enhance the number of design variations possible, ordinary bonding procedures have been found to be insufficient. This is especially so when the base and intermediate sheets employed are of greater gauge values, i. e. thicknesses, than the top sheet which is to be superposed thereon for forming, together with the intermediate sheet, the design.

Specifically, it has become evident that the bonds established between three or more layers or sheets of plastic materials when ordinary heating methods are employed, such as heating of the die only, are substantially unsatisfactory when the die is kept at relatively low temperatures. This is due to the fact that at such temperatures only the upper two sheets are softened sufficiently to be fully bonded to each other while the third and any further sheets are affected only to a slight degree.

It has been proposed, in order to overcome this deficiency, to increase the heat supplied to the die to bring the latter to a relatively high temperature capable of affecting even the lowest sheet. This expedient has failed to solve the problem since the temperature required is so high that the upper sheet, and especially the thin one, will be melted and rendered substantially unfit for their intended purpose.

It is, therefore, another principal object of the present invention to provide means enabling the above set forth disadvantages and drawbacks to be overcome in a reliable and thoroughly efficient manner, whereby production of applique work of high quality is ensured unaccompanied by any substantial loss or wastage of material during the production process.

These and other objects and advantages of the invention will become further apparent from the following detailed description, reference being made to the accompanying drawing showing a preferred embodiment of the invention.

In the drawing:

Fig. 1 is a schematic and diagrammatic illustration of an apparatus constructed in accordance with the present invention, the heating circuit for the die and safety means associated with said apparatus also being shown; and Fig. 2 is a schematic wiring diagram illustrating the relationship between the aforesaid safety means and the arc elimination means of the present invention.

While there is shown and described herein certain specific structure embodying the invention, it will be manifest to those skilled in the art that various modifications and rearrangements of the parts may be made without departing from the scope of the invention, and that the same is not limited to the particular form herein shown and described, except in so far as indicated by the appended claims.

Referring now more particularly to Fig. 1, the applique-forming apparatus of the present invention resembles a press and generally comprises a base or bed plate 11 supported on a suitable foundation 12 and a platen 13 carrying a die 13' on its lower surface and arranged directly above the bed plate 11. As will be more fully explained hereinafter, the contact face of the die is suitably contoured in accordance with the design of the applique ornamentation to be produced.

The platen 13 and the die 13' together constitute the die means or pressure-applying means of the apparatus and are supported from a plate 14 of insulating material, such as "Bakelite," by means of leveling screws 15 fixed to the platen and extending through the plate 14. Leveling of the die means 13—13' is effected through manipulation of the nuts 15' and 15'' threaded onto the screws 15 on opposite sides of the plate 14. The bed plate 11 constitutes backing means against which the sheets to be bonded are to be pressed by the pressure-applying die means, as more fully explained hereinafter.

The plate 14 is rigidly connected to a ram 16 which constitutes, effectively, a piston rod connected to a power piston 17 reciprocally disposed in a power cylinder 18. The piston 17 is actuated by compressed air derived from a source C and admitted selectively into the cylinder 18 via a valve V and conduits 19 and 20.

Thus, when air is admitted to the upper portion of the cylinder 18, the piston 17 will be moved toward the bottom of said cylinder, as indicated in broken lines at 17', so as to advance the die toward the bed plate 11. When air is admitted to the cylinder through the conduit 20, the piston 17 is moved toward the top of the cylinder 18, as shown in broken lines at 17'' so as to retract the die from the bed plate.

An additional conduit 21 leads from the valve V to an electrically grounded cylinder 22 in which a piston 23 is reciprocally disposed. A piston rod 24, connected to the piston 23 and in electrical contact with the cylinder 22, extends exteriorly of the latter, and a spring 25 bears on the piston 23 within the cylinder 22 to bias the piston toward the upper end of the cylinder.

The platen 13 is substantially hollow and has positioned therein electric heating means, such as a heating element 26. The latter is affixed to and electrically insulated from the platen, by way of example, by means of asbestos struts or other bearing members (not shown). Thus, the die attached to the platen is arranged to be radiantly heated by the heating element 26.

Current is supplied to the heating element via leads 26' from a suitable power source, e. g. a 110 v. or 220 v. 60 cycle A. C. source, through a potentiometer 27. Arranged in the line from the potentiometer to the heating element is a fuse 27', a first manually operated power switch S' and a second manually operated power switch S''. Accordingly, radiant heating of the die is prevented unless both the switches S' and S'' are closed. This is one of the safety features of the present invention.

A suitable signal lamp or pilot light 28 is connected across the switch S'' so as to provide an indication that current is being supplied to the heating element 26. Connected between the switch S'' and the leads 26' is a suitable high frequency filter arrangement F the purpose of which will also be more full explained below. If desired, a suitable housing 29 may be provided for the filter arrangement F and the circuit of the indicator lamp 28.

The platen 13 and the die attached thereto are made of a metal or alloy, for example aluminum, of good electrical conductivity characteristics. Pulsating D. C. voltages of high frequency are derived from a radio frequency (RF) oscillator or generator 30 (Fig. 2) equipped with suitable rectifier means (not shown) in such a manner that the output signal of the generator varies between zero or ground potential and a predetermined maximum potential.

The high potential output terminal of the generator circuit is connected to the platen 13 by means of a conductor 31, while the ground potential output terminal of the generator circuit is effectively connected to the base or bed plate 11. The RF oscillator, which may, for example, be of a conventional type including a triode 32, is controlled by a switch 33 ganged with and forming a part of the first power switch S'.

Thus, it will be seen that when the switch S' is open no current flows to the heating element 26 and no RF potential is applied to the platen 13 of the apparatus. The filter arrangements F prevent flow of RF induced currents from the heater leads 26' to the pilot light and to the power source.

As may be seen from Fig. 2, the grid of the triode 32 is connected to a source of high negative potential 34 which is actuated or triggered by a thyratron 35. The grid of the thyratron 35 has a predetermined negative bias potential applied thereto from a sensitivity control circuit 36, the operating characteristics of the thyratron being so chosen that it is rendered conductive whenever its grid bias voltage reaches zero or ground potential.

It will be readily understood that when the thyratron becomes conductive it causes a high negative potential, e. g. 1000 v., to be applied to the grid of the tube 32 so as to interrupt operation of the oscillator or generator 30.

The grid of the thyratron 35 is additional connected through inductances 37 and 38 and a resistor 41 to the platen 13 and thence through the conductor 31 to a connector or like portion 31' of the RF circuit. Grounded capacitors 39 and 40 are connected in parallel between the inductances 37 and 38. The inductances 37 and 38 and the capacitors 39 and 40 serve as a filter or blocking arrangement and prevent application of RF potentials to the grid of the thyratron 35.

The circuit portion 31' may, by way of example, be a bracket attached to and electrically insulated from the foundation or frame of the apparatus and disposed in the path of movement of the piston rod 24. In this manner, the bracket constitutes abutment means engageable by said piston rod upon protraction thereof under fluid pressure applied to the piston 23 in the cylinder 22.

The valve V is of such construction that enables air or a similar fluid under pressure to flow through the conduit 21 and into the cylinder 22 only when the piston 17 and, consequently, the platen 13 are moving or have moved toward their upper positions, i. e., when air is admitted to the cylinder 18 through the conduit 20. Consequently, the piston 23 is forced downwardly against the biasing force of the spring 25 until the outermost end of the piston rod 24 comes into contact with the bracket-like portion 31' of the high potential part of the RF circuit.

During the downstroke of the platen, however, air is exhausted from the cylinder 22 to permit the spring 25 to force the piston 23 upwardly and to disconnect the piston rod 24 from the circuit portion 31'.

As will be readily realized, when the piston 23 is moved, during the upstroke of the platen 13, to bring the piston rod 24 into contact with the RF circuit portion 31', the latter is grounded. Thus, a direct current circuit between the grid of the thyratron 35 and ground is established.

This immediately causes the thyratron to become conductive, energizing the source of high negative potential 34 and causing the output of the latter, i. e., 1000 v. (negative), to be applied to the grid of the oscillator tube 32. The operation of the RF oscillator is, therefore, substantially instantaneously interrupted and RF potential removed from the platen 13 and from the die 13'.

From the above it will be seen that the cylinder 22, piston 23 and piston rod 24, which make up interrupter means electrically connected to the radio or high frequency heat generating means 30—13—11 for cutting off the operation of the latter, also constitute another safety means which in conjunction with the electronic means 34, 35, etc., serves to protect the operator of the apparatus. This is of special importance whenever repairs are being carried out or replacements of the die or dies are being made.

The last-described safety arrangement additionally serves to protect the die against being burned or destroyed through arcing between the die and the bed plate 11. This may best be understood from Fig. 2, where arcing between the die (not shown) and the bed plate 11 is diagrammatically illustrated by broken lines at 42.

It will be readily realized that, as soon as the arc is established, the grid of the thyratron 35 is shorted to ground through the platen 13 to effect a substantially instantaneous application of high negative potential from the source 34 to the grid of the oscillator triode 32 so as to cut off the RF potential from the platen 13. Thus, arcing has substantially the same effect as protraction of the piston rod 24 upon upward movement of the platen 13.

In this manner, the operation of the apparatus according to the present invention is completely safe, both during the power or downstroke as well as during the upstroke of the platen 13, for the operator as well as for the die being employed.

The possibility of arcing is additionally reduced due to another characteristic of the present invention. When RF potentials are applied across the platen and bed plate with the sheets of plastic being fused located therebetween, the Q of the RF circuit, i. e., the ratio of its inductive reactance to its resistance, is reduced and the time constant of the circuit increased due to the presence of said sheets.

Thus, the build-up of current flow in said RF circuit to its maximum value is slowed down to a certain extent. Since the current build-up is retarded, the creation of arcs is substantially inhibited.

The above described safety means 22—24 constituting a feature of the present invention further prevents application of the voltage on the heating element to the die. This is of special importance when the latter is subject to being touched or manipulated by the operator, i. e., when the platen 13 is in its upper postion. An electric shock resulting from 220 volts and a relatively high current could be very dangerous if not fatal.

However, should the heating element accidentally be shorted to the platen when the latter is raised, the grounding of the platen by the piston rod 24 and cylinder 22 would immediately ground the leads 26' and thus blow the fuse 27' in the power circuit for the heating element 26. Simultaneously, the pilot light 28 would be extinguished to inform the operator of the presence of the short circuit. Operation cannot be resumed, of course, until the short circuit is eliminated.

Still a further safety feature may be provided, in accordance with the present invention, by preventing application of RF potentials to the platen 13 and die 13' during the downstroke of the latter until the latter reaches the immediate vicinity of the bed plate 11 and the sheets located thereon. In other words, even though the switch 33 of the first power switch assembly S' is closed and even though the piston 23 and piston rod 24 of the safety cylinder 22 are retracted from the RF circuit portion 31', no RF potentials are applied to the platen.

To this end, a pair of micro-switches (not shown) are connected in series with the switch 33. These microswitches may be positioned on a suitable support adjacent and in the path of movement of the insulating plate 14 or of an actuating element attached thereto, for example, so as to be closed by said plate or element when the platen approaches its lowermost position and permit energization of the RF output circuit. When the platen recommences its upward movement the micro-switches are again opened to break the RF circuit.

Thus, these micro-switches are additional interrupter means electrically connected to the radio frequency heat generating means for cutting off the operation of the latter. Other types of switches may, of course, be employed.

It is to be noted that the means actuating the interrupter means upon termination of the bonding or welding operation need not be the same as those specifically illustrated in the drawing.

In operation, three sheets 43, 44 and 45 made, for example, of vinyl plastic materials, are positioned between the backing means and the pressure-applying means, i. e., on the bed plate 11 beneath the platen 13 and die 13'. At this time the piston 17 is in its uppermost position (at 17") while the piston rod 24 is in its most protracted position, thus shorting the RF circuit to ground. The switches S' and S" are open.

At this point it must be noted that one of the fundamental characteristics of RF heating is that the heat generated by the RF field appears to start or be initially concentrated in the center of a mass to be heated and then travels outwardly from said center, whereby the heat available at the outer edges or borders of said mass is substantially less than that available at the center thereof. Accordingly, if the two lower sheets 43 and 44 are much thicker than the upper, applique-forming sheet 45, the RF-generated heat will initially be substantially concentrated at the interface between the lower sheets to produce a good bond or weld therebetween, while the heat reaching the interface between the thin sheet 45 and the upper thick sheet 43 will be insufficient to form a good bond or weld between said sheets 45 and 43.

The same result would also obtain if only one thick sheet and one thin, applique-forming sheet were used. In other words, it is generally impracticable to weld a thin sheet to a thick sheet adequately by means of RF heat alone unless both the amount of heat applied and the duration of its application are increased to such an extent as to render the process substantially uneconomical.

It is for this reason that the die 13' is heated by the element 26, preferably to a temperature approximating the fusion temperature of the material of which the uppermost thin sheet 45 is made. The radiant heat imparted to the die thus is employed to supplement the residue of the RF heat reaching the interface or junction between the sheets 45 and 43, whereby a good bond or weld can also be formed between these two sheets.

The switches S' and S" are now closed whereby, assuming no short between the heating element 26 and the platen 13, the pilot light 28 is lit and current flows through the element 26 to heat the die. The RF generator is still, however, maintained in an inoperative condition through the grounding of the circuit portion 31'.

Upon manipulation of the valve V either manually or automatically, air or like fluid under pressure is now fed from the source C through the valve V and conduit 19 to the cylinder 18 to effect the downstroke or power stroke of the platen 13 and die 13'. At the same time, air is exhausted from the safety cylinder 22 and the piston rod 24 is retracted by the action of the spring 25. As the piston 17 nears the end of its travel, the microswitches (if these be used at all) are closed by the plate 14 (or by a suitable operating member attached thereto) and RF potentials, i. e., a high frequency signal, applied across the platen 13 and bed plate 11 to create an RF field therebetween at the location of the sheets 43, 44 and 45.

The die 13' itself is provided on its contact face with relatively sharp ridges or elevations (shown only schematically in Fig. 1), the apices of which are located along contour lines corresponding to the contours of the design to be imparted to the applique ornamentation. By virtue of these ridges, and partly also due to the skin effect normally encountered in high frequency operations, the RF field will be concentrated for the most part between said ridges and the bed plate.

The radiantly heated die now contacts the upper, applique-forming sheet 45 and upon application of further pressure to the die, impressions are formed in the three sheets along lines corresponding to the contours of the ridges on the contact face of the die. Due to the relative thinness of the sheet 45, a good bond or seal is effected between the sheets 43 and 45 along said lines by means of the joint effect of the heat of the die and the residue of the RF heat generated between the sheets 43 and 44.

The bonds between the sheets 43 and 44, however, which are much thicker than the sheet 45 are, as stated above, formed substantially solely by means of the RF heat provided in accordance with the invention.

Since the RF field extends from the die to the bed plate, even those sheets located at a considerable distance from the die and not easily fusible by the heat produced by the heating element 26 may be completely fused or bonded to one another along said lines corresponding to the contours of the die contact face.

As is well understood, the die ridges form impressions in the sheets without cutting through the latter. After completion of the bonding operation, the valve is operated to conduct air through the conduit 20 into the lower part of the cylinder 18 to move the piston 17 and the die means 13—13' away from the bed plate 11 to permit removal of the sheets 43, 44 and 45 from said bed plate. As set forth above, the platen is grounded concurrently therewith by the piston rod 24 to shut off the RF generator.

Those portions of one or more of the upper sheets lying externally of the design produced by the die may now be simply and easily torn off along the lines of said impressions formed by the die in the sheets, leaving the applique portions affixed to the base sheet within the peripheral boundaries of the latter.

The following operating conditions, which were maintained during formation of an applique ornamentation from two sheets of a vinyl plastic material bonded in a single operation to a third or base sheet of said material, will serve to illustrate the practice of the invention. The thinnest and uppermost sheet had a thickness of 4 gauge, while the base sheet and the intermediate sheet had thicknesses of 20 gauge each.

The die was heated to a temperature of about 250° F., which approximates the fusion temperature of the plastic material, while the RF generator was set at 27 mc. The ram of the press was thereafter moved downwardly to effect a die pressure of about 35 p. s. i. over a cumulative sealing area of about 2 in.$^2$, the contact between the die and the uppermost sheet being maintained for a period of about one-half second. The RF heat was supplied by a 3 kw. power unit set at one-third of its maximum output. Thus, effectively, one kw. of RF power was used in forming the seal or bond between the sheets along the lines of the die contact face.

The highly enhanced efficiency of the process and apparatus of the present invention will be readily recognized when it is considered that heretofore known apparatus of this type required at least twice as much power input to the die and a much greater duration of pressure application in order to bond only two sheets over an equivalent area. Stated another way, with a predetermined RF power consumption equal to that employed in known apparatus, a good bond between three sheets or more can be formed by the apparatus of the invention over a considerably larger area and in less time than has heretofore been possible.

A concomitant of the above-mentioned increased efficiency is that, since less RF heat is needed than would be the case with an unheated die, the life of the die is prolonged since the possibility of arcing is reduced together with the RF power applied to the die. The cost of production of the applique ornamented articles is, therefore, correspondingly decreased despite the fact that more fancy and complex designs can be formed with the apparatus of the present invention than with known apparatus.

One of the substantial advantages inherent in the use of a heated die in conjunction with RF heating according to the present invention is that heat dissipation from the uppermost layer or sheet of plastic material is reduced to a great extent. It will be readily seen that if the die were cold, heat would be conducted from the uppermost sheet to the die and perhaps radiated therefrom to the surrounding atmosphere, while additional heat would be radiated directly into the atmosphere from the uppermost sheet. Of course, the quality of the weld between the thick and thin sheets would be inadequate.

The extra heat supplied by the heated die thus compensates for any heat dissipation from the plastic sheets by concentrating more heat on the top layer or sheet than on the lower layers or sheets. The extra heat also enhances the quality of the weld between the thick and thin sheets and facilitates tearing of the unwanted portions of the applique-forming sheets from the base sheet after completion of the weld or bond.

Moreover, the invention overcomes the problems of unequal heat dissipation from and unequal heat absorption by sheets of different thicknesses. The fused connections between the sheets, consequently, will be uniform despite the fact that a thin gauge material is bonded to a heavier gauge material.

It will be readily understood that the invention is susceptible to a variety of modifications, both as regards the apparatus and the process, none of which involves a departure from the spirit and scope of the invention. Thus, for example, the temperature of the die may be varied as desired depending on the thermal properties of the plastic material being worked on, while the die pressure, the duration of pressure application, the frequency setting of the RF generator and the RF power output may all be varied, as the occasion arises, from the illustrative values set forth above. One such occasion may arise if only two sheets are to be bonded or sealed to one another, in which event the power consumed may be reduced even further.

Having thus described the invention, what is claimed as new and desired to be secured by Letters Patent, is:

1. The process of bonding a plurality of sheets of thermoplastic material to each other along lines corresponding to contact face contours of a die with at least one of said sheets thinner than any other sheet of said plurality of sheets, comprising the steps of placing said sheets in superposed relation onto a base with said thin sheet uppermost, radiantly heating said die to a temperature of about 250° F., applying fluid under pressure to a member connected to said die to force the latter for a period of about one half second onto said sheets under a pressure of about 35 p. s. i. to thereby form impressions in said sheets shaped in accordance with the line contact between said die and said sheets, and simultaneously applying a high frequency signal of about 27 mc. across said die and base to establish a corresponding high frequency field between said die and said base at the location of said impressions in said sheets to heat the latter, whereby said sheets are bonded to each other at said impressions.

2. The process of producing applique ornamentation, comprising the steps of placing a first sheet of thermoplastic material and of predetermined thickness onto a support, superposing a second sheet of thermoplastic material and of the same predetermined thickness onto said first sheet, superposing onto said second sheet a third sheet of thermoplastic material and of lesser thickness than said first sheet and said second sheet, said sheets being colored in accordance with the desired color scheme of said ornamentation, radiantly heating a die having contact face contours corresponding to the desired design of said ornamentation to a working temperature approximating the fusion temperature of said material, pressing said die while heated to said working temperature against said sheets to form impressions in the latter and within the peripheral boundaries thereof, whereby said impressions are shaped in accordance with the design-forming line contact between said die and said sheets, simultaneously applying pulsating D. C. potentials in the radio frequency range across said die and said support to establish a radio frequency field therebetween for additionally heating said sheets, whereby said first and second sheets are fused to each other along said impressions solely by means of a portion of the heat generated by said radio frequency field while said second and third sheets are fused to each other along said impressions by means of the joint effect of the heat emanating from said die and of a further portion of said heat generated by said radio frequency field, removing said die from said sheets and simultaneously cutting off application of said potentials to thereby interrupt said radio frequency field, and tearing portions of said second and third sheets located between said impressions and said peripheral boundaries away from said first sheet to thereby leave the ornamentation-forming portions of said second and third sheets attached to said first sheet.

3. An apparatus for bonding at least three sheets of thermoplastic material to one another, comprising an electrically grounded base plate for supporting said sheets in superposed relation, hollow electrically conductive die means having a contact face of predetermined line contours disposed above said base plate, power means connected to said die means and electrically insulated therefrom for reciprocally displacing the latter toward and away from said base plate, respectively, whereby pressure may be applied to said sheets by said die means upon movement of the latter toward said base plate, electric heating means disposed within and electrically insulated from said die means and arranged to radiantly heat the latter, a radio frequency generator circuit having a high potential output terminal connected to said die means and a ground potential output terminal connected to said base plate for establishing a radio frequency field between said die means and said base plate, safety means actuated jointly with said power means and in response to displacement of said die means by said power means away from said base plate to ground said die means, electronic means connected to said die means and arranged to be energized through grounding of said die means by said safety means for interrupting operation of said radio frequency generator circuit to thereby destroy said radio frequency field, electric circuit means connected to said heating means and including switch means for opening and closing said circuit means to control flow of electric current to said heating means, and a switch ganged with said switch means for controlling said radio frequency generator circuit jointly with control of said electric circuit means for said heating means by said switch means.

4. An apparatus according to claim 3, said hollow die means comprising a hollow platen having a first supporting surface facing said base plate and a second supporting surface facing away from said base plate, and a die carried by said platen at said first supporting surface, both said platen and said die being electrically conductive, said power means for reciprocally displacing said die means being connected to said second supporting surface of said platen, said high potential terminal of said radio frequency generator circuit being electrically connected to said platen.

5. An apparatus according to claim 3, said safety means comprising an electrically grounded cylinder, a piston reciprocally movable between a first position and a second position in said cylinder and provided with a piston rod extending out of said cylinder and in electrical contact therewith, abutment means electrically connected to said die means and positioned for engagement by said piston rod upon movement of said piston to said first position, resilient means operatively connected to said piston and biasing the latter toward said second position for retracting said piston rod from engagement with said abutment means, and pneumatic means operated in response to displacement of said die means by said power means away from said base plate for moving said piston to said first position, to thereby ground said die means through said abutment means, said piston rod and said cylinder.

6. An apparatus according to claim 5, said power means for reciprocally displacing said die means comprising a power cylinder, a power piston reciprocally disposed in said power cylinder, a ram interconnecting said power piston with said die means, conduit means for feeding fluid under pressure into said power cylinder adjacent opposite faces of said power piston, respectively, and valve means for controlling both said conduit means and said pneumatic means.

7. An apparatus according to claim 3, further comprising additional switch means connected with said electric circuit means for controlling the latter independently of said first-named switch means, whereby flow of electric current to said heating means may be interrupted by said additional switch means despite operation of said switch ganged with said first-named switch means to energize said radio frequency generator circuit.

8. An apparatus for bonding at least three sheets of thermoplastic material to one another, comprising an electrically grounded bed plate for supporting said sheets in superposed relation, die means of electrically conductive material having a contact face of predetermined line contours, said die being disposed above said bed plate, power means connected to said die means and electrically insulated therefrom for reciprocally displacing the latter toward and away from said bed plate, respectively, heating means carried by said die means and arranged to radiantly heat the latter, a radio frequency generator circuit having a high potential output terminal connected to said die means and a ground potential output terminal connected to said bed plate for establishing a radio frequency field between said die means and said plate, safety means actuated solely in response to displacement of said die means by said power means away from said bed plate to ground said die means, and electronic means connected to said die means and arranged to be energized through grounding of said die means by said safety means for interrupting operation of said radio frequency generator circuit to thereby destroy said ratio frequency field.

9. An apparatus for fusing a plurality of sheets of thermoplastic material to one another, comprising an electrically grounded bed plate for supporting said sheets in superposed relation, a hollow platen positioned above said bed plate, a die supported by said platen and electrically continuous therewith, a piston and cylinder combination, a piston rod coupling said piston and said platen so that reciprocal movement of said piston in said cylinder controls the spacing of said die from said bed plate, said die having a contact face with predetermined line contours, whereby, upon movement of said die toward said bed plate with said sheets supported thereon, said contact face of said die engages one of said sheets and forms in all of said sheets impressions contoured in accordance with the line contours of said contact face, a source of radio frequency power coupled to said platen and to said grounded bed plate to constitute with the same a complete radio frequency circuit, a heating element within and electrically insulated from said hollow platen for the radiant heating of said die, a source of low frequency power for said heating element, a radio frequency isolation filter coupling said heating element to said source of low frequency power, safety means responsive to die-retracting movement of said piston in said cylinder for grounding the output of said source of radio frequency power, and electronic means coupled to said source of radio frequency power and being responsive to output-grounding action of said safety means for inactivating said source of radio frequency power, whereby upon movement of said die toward said bed plate said sheets are heated by means of said heated die and radio frequency power to fuse said sheets to one another along said impressions, while said radiant heating of said die by said heating element further reduces dissipation of heat from said sheets to the surrounding ambient atmosphere and simultaneously reduces the possibility of arcing between said die means and said bed plate to thereby prolong the useful life of said die means.

10. Apparatus for bonding together a plurality of thermoplastic sheets comprising an electrically grounded bed plate, a hollow platen positioned above said bed plate, a power piston and cylinder combination, a ram coupling said piston and said platen so that the position of said piston in said power cylinder controls the spacing of said platen from said bed plate, a die supported on said platen and electrically continuous therewith, said die having a contact face with predetermined line contours, a source of radio frequency power coupled to said platen and to said grounded bed plate to constitute with the same a complete radio frequency circuit, a heating element within and electrically insulated from said hollow platen for the radiant heating of said die, a source of low frequency power for said heating element, a radio frequency isolation filter coupling said heating element to said source of low frequency power, an electrically grounded safety piston and cylinder combination, means normally urging said safety piston to an innermost position in said safety cylinder, said radio frequency circuit including a connector coupling the output of said source of radio frequency power and said platen, a piston rod electrically continuous with said safety piston and spaced from said connector when said safety piston is in said innermost position, said power cylinder and said safety cylinder being pneumatically coupled for reciprocal operation, whereby as said power piston is moved in said power cylinder to retract said die from said bed plate said safety piston is urged outwardly from said safety cylinder to thereby bring said piston rod into contact with said connector to ground the latter and thereby the output of said source of radio frequency power.

11. The process of bonding a plurality of sheets of thermoplastic material to one another, comprising the steps of arranging said sheets in superposed and surface contact relation with respect to each other between pressure-applying means and backing means, forcing said pressure-applying means against the outermost one of said sheets remote from said backing means, softening said outermost sheet through the action of radiant heat imparted to said pressure-applying means in bringing the temperature of the latter to a value approximating the fusion temperature of said material, and simultaneously applying radio frequency heat to said sheets, whereby heat imparted to said outermost sheet by said pressure-applying means supplements said radio frequency heat to bring about uniform bonding of said sheets to one another.

12. The process of bonding a plurality of sheets of thermoplastic material to one another, comprising the steps of arranging said sheets in stack formation and in surface contact relation with respect to each other between pressure-applying means and backing means, forcing said pressure-applying means against the outermost one of said sheets most remote from said backing means and over at least one predetermined region having boundaries located within and spaced from the outer confines of said sheets, softening said outermost sheet through the action of radiant heat directed toward said sheets and imparted to said pressure-applying means in bringing the temperature of the latter to a value approximating the fusion temperature of said material, simultaneously applying a radio frequency field through said sheets to thereby generate radio frequency heat at the center of said stack with at least some of said radio frequency heat directed oppositely to said radiant heat, whereby heat imparted to said outermost sheet by said pressure-applying means supplements said radio frequency heat to bring about thorough bonding of said sheets to one another along said boundaries of said region, cutting off at least said radio frequency heat upon termination of said bonding, and tearing those portions of at least said outermost sheet located between said boundaries and said confines from the remainder of said plurality of sheets, other portions of said outermost sheet located within said boundaries remaining bonded to said remainder of said plurality of sheets.

13. The process of bonding a plurality of sheets of different thicknesses and of thermoplastic material to one another, comprising the steps of arranging said sheets in superposed and surface contact relation with respect to each other between pressure-applying means and backing means with the thinnest sheet being most remote from said backing means, forcing said pressure-applying means against said thinnest sheet over at least one predetermined region having boundaries located within the outer confines of said sheets, softening said thinnest sheet through the action of radiant heat imparted to said pressure-applying means in bringing the temperature of the latter to a value approximating the fusion temperature of said material, simultaneously applying radio frequency heat to said sheets, whereby heat imparted to said thinnest sheet by said pressure-applying means supplements said radio frequency heat to bring about uniform bonding of said sheets to one another along said boundaries of said region, cutting off at least said radio frequency heat upon termination of said bonding, and tearing portions of at least said thinnest sheet located between said boundaries and said confines from the remainder of said plurality of sheets, other portions of said thinnest sheet located within said boundaries remaining bonded to said remainder of said plurality of sheets.

14. An apparatus for bonding to one another a plurality of sheets of thermoplastic material arranged in surface contact relation with respect to one another, comprising die means having a contact face for engagement with one of the outermost sheets of said plurality of sheets, backing means for engagement with the other outermost sheet of said plurality of sheets, power means connected to said die means for reciprocally displacing the latter toward and away from said backing means, respectively, so as to apply pressure to said sheets when located between said die means and said backing means, heating means carried by said die means and arranged to radiantly heat the latter to a temperature sufficient to soften said one outermost sheet, radio frequency heat generating means operatively connected across said die means and said backing means for heating said sheets when located between said die means and said backing means, whereby said heat imparted to said one outermost sheet by said die means supplements said radio frequency heat to ensure uniform bonding of said sheets to one another, interrupter means electrically connected to at least said radio frequency heat generating means, and means actuating said interrupter means to cut off the operation of said radio frequency heat generating means upon termination of said bonding of said sheets.

References Cited in the file of this patent

UNITED STATES PATENTS

| 2,324,068 | Crandell | July 13, 1943 |
| 2,453,680 | Sweeny | Nov. 9, 1948 |
| 2,457,659 | Graham et al. | Dec. 28, 1948 |
| 2,631,646 | Gannon et al. | Mar. 17, 1953 |

FOREIGN PATENTS

| 631,395 | Great Britain | Nov. 2, 1949 |